United States Patent
Luu et al.

(10) Patent No.: US 11,733,380 B2
(45) Date of Patent: Aug. 22, 2023

(54) USING AN ACOUSTIC DEVICE TO IDENTIFY EXTERNAL APPARATUS MOUNTED TO A TUBULAR

(71) Applicant: DarkVision Technologies Inc, North Vancouver (CA)

(72) Inventors: Timothy Luu, North Vancouver (CA); Anas Mahmoud, North Vancouver (CA)

(73) Assignee: DarkVision Technologies Inc, North Vancouver (CA)

( * ) Notice: Subject to any disclaimer, the term of this patent is extended or adjusted under 35 U.S.C. 154(b) by 93 days.

(21) Appl. No.: 17/091,271

(22) Filed: Nov. 6, 2020

(65) Prior Publication Data

US 2021/0142515 A1 May 13, 2021

(30) Foreign Application Priority Data

Nov. 8, 2019 (GB) .................... 1916315

(51) Int. Cl.
| | | |
|---|---|---|
| *G06T 7/73* | (2017.01) | |
| *G01S 15/88* | (2006.01) | |
| *G06F 16/587* | (2019.01) | |
| *G06F 16/215* | (2019.01) | |
| *E21B 47/002* | (2012.01) | |

(Continued)

(52) U.S. Cl.
CPC .............. *G01S 15/88* (2013.01); *E21B 17/08* (2013.01); *E21B 47/007* (2020.05); *E21B 47/0025* (2020.05); *G01M 3/00* (2013.01); *G01S 15/8945* (2013.01); *G06F 16/215* (2019.01); *G06F 16/587* (2019.01); *G06F 18/214* (2023.01); *G06N 3/04* (2013.01); *G06N 3/08* (2013.01); *G06T 7/0002* (2013.01); *G06T 7/74* (2017.01); *G06V 10/454* (2022.01); *G06V 10/82* (2022.01);

(Continued)

(58) Field of Classification Search
None
See application file for complete search history.

(56) References Cited

U.S. PATENT DOCUMENTS

| | | |
|---|---|---|
| 5,996,711 A | 12/1999 | Ohmer |
| 2016/0327675 A1 | 11/2016 | Donderici |

(Continued)

FOREIGN PATENT DOCUMENTS

| | | |
|---|---|---|
| GB | 2572834 B | 4/2020 |
| WO | 2015088351 A1 | 6/2015 |

(Continued)

OTHER PUBLICATIONS

Office action received for CA patent application No. 3098183, dated Feb. 15, 2022, 6 pages.

(Continued)

*Primary Examiner* — Leon Flores

(57) ABSTRACT

A method, apparatus and system for locating external apparatus mounted to a tubular in a wellbore. The identification of apparatus, such as cable clamps, enables other tools in the string to operate more precisely. A computer model is used to locate the apparatus from acoustic images, which images are acquired using a downhole device having an acoustic sensor or acoustic array. The model may be a classifier, which may be machine trained to classify whether an apparatus is present, its location and its orientation. Automating this locating enables very long wellbores to be processed quickly.

20 Claims, 14 Drawing Sheets

(51) Int. Cl.
<table>
<tr><td>G01S 15/89</td><td>(2006.01)</td></tr>
<tr><td>G06N 3/04</td><td>(2023.01)</td></tr>
<tr><td>G06N 3/08</td><td>(2023.01)</td></tr>
<tr><td>E21B 47/007</td><td>(2012.01)</td></tr>
<tr><td>E21B 17/08</td><td>(2006.01)</td></tr>
<tr><td>G01M 3/00</td><td>(2006.01)</td></tr>
<tr><td>G06T 7/00</td><td>(2017.01)</td></tr>
<tr><td>G06F 18/214</td><td>(2023.01)</td></tr>
<tr><td>G06V 10/82</td><td>(2022.01)</td></tr>
<tr><td>G06V 10/44</td><td>(2022.01)</td></tr>
<tr><td>G06V 20/10</td><td>(2022.01)</td></tr>
</table>

(52) U.S. Cl.
CPC .......... *G06V 20/10* (2022.01); *E21B 2200/20* (2020.05); *E21B 2200/22* (2020.05); *G06T 2207/10132* (2013.01); *G06T 2207/20081* (2013.01); *G06T 2207/20084* (2013.01)

(56) References Cited

U.S. PATENT DOCUMENTS

2017/0090058 A1    3/2017  Brill
2018/0328163 A1   11/2018  Hayman et al.
2019/0136650 A1*   5/2019  Zheng ................... E21B 19/166

FOREIGN PATENT DOCUMENTS

<table>
<tr><td>WO</td><td>2016187242 A1</td><td>11/2016</td></tr>
<tr><td>WO</td><td>2016201583 A1</td><td>12/2016</td></tr>
<tr><td>WO</td><td>2018183084 A1</td><td>10/2018</td></tr>
<tr><td>WO</td><td>2019147139 A2</td><td>8/2019</td></tr>
</table>

OTHER PUBLICATIONS

Office action received for CA application No. 3098183, dated Jun. 30, 2022, 3 pages.
Archer, "Official SPACE Brochure—Inside SPACE—Adding a new dimension to information," Retrieved from archerwell.com, pp. 6, 2012.
Archer, "Typical application for the SPACE family of tools", "Orientation of control lines and clamps," Retrieved from www.archerwell.com/products-services/wireline/cased-hole-logging-services/space/, pp. 4, May 2018.
Archer, "Wireline Product Catalogue—Captured by SPACE—3D perspective on Well Performance," Retrieved from Archerwell.com, pp. 40, 2015.
Ren, S, et al., "Faster R-CNN: Towards Real-Time Object Detection with Region Proposal Networks", Retrieved from the Internet URL: https://arxiv.org/abs/1506.01497, pp. 1-14, 2016.

* cited by examiner

70 Deploy device on wireline to production zone in well

71 Transmit radial scan lines while deploying device thru the well

73 Receive reflections to create very long, circumferential image(s)

74 Select region of image and filter noise or convert to certain intensity features

75 [Detect edges within region]

76 Identify apparatuses within region using computer model and store their locations.

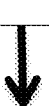

77 Report location and orientation of identified apparatuses

79 Move device in well to next likely apparatus

Fig. 7

USING AN ACOUSTIC DEVICE TO IDENTIFY EXTERNAL APPARATUS MOUNTED TO A TUBULAR

RELATED APPLICATIONS

This application claims priority to United Kingdom Application No. GB1916315.3, filed on Nov. 8, 2019, the disclosure of which is incorporated herein by reference in its entirety.

FIELD OF THE INVENTION

The invention relates generally to inspection of fluid-carrying systems, in particular, acoustic sensors detecting apparatus mounted to tubulars in oil and gas wells and pipelines.

BACKGROUND OF THE INVENTION

In some industrial situations, apparatus is connected to the outside of the tubular to perform some function, often to monitor the fluid or operation. The performance of the apparatus or of other operations may be affected by the location or orientation of this apparatus. For example, cables for thermocouples, fiber, piezometers, and other instrumentation may be externally mounted using cable protectors clamped to the tubular. Their operation or the ability to perforate production casing may require knowing the apparatus' location (depth and azimuth), so that the clamp or cable running therebetween isn't severed during perforation. Other common external apparatus at risk include small stainless-steel tubes, float collars, landing collars, centralizers, connections, float subs, carriers, SSSV, sleeves and burst ports.

Existing devices use magnetic sensors to detect the extra metal mass of the apparatus. However, the azimuthal precision of these devices is quite low, so the location and orientation are uncertain. As a consequence, subsequent operations, such as perforating, are limited in angles where they can be performed.

WO2018183084A1 entitled "Cable system for downhole use and method of perforating a wellbore tubular" discloses a system to detect fibre optic cable by sensing magnetic permeability. The output is a value that is read by an operator to manually locate the cables.

The inventors have appreciated a need to locate the apparatus with high precision and use this information in other downhole operations.

SUMMARY OF THE INVENTION

In accordance with the invention, there is provided a method of locating apparatus mounted external to a tubular, the method comprising: deploying an imaging device having an acoustic sensor into the tubular; creating acoustic images using the acoustic sensor from acoustic reflections from the tubular and portions of the apparatus contacting the tubular; and processing the acoustic images with a computer model to determine a location of the apparatus.

The model may use intensity features of the image, such as: maximum intensity, average intensity, standard deviation of intensity, average intensities for plural radial ranges, or radius of center of intensity.

In accordance with the invention, there is provided a system for locating apparatus mounted external to a tubular, comprising: an imaging device deployable into the tubular and comprising an acoustic sensor; one or more processors; and one or more memory units storing instructions that are operable by the one or more processors to perform operations. The operations comprise: creating acoustic images using the acoustic sensor from acoustic reflections from the tubular and portions of the apparatus contacting the tubular; storing the acoustic images in the one or more memory units; and processing the acoustic images with a computer model to locate the apparatus.

In accordance with the invention, there is provided an apparatus, comprising: one or more non-transitory memories storing a computer model of acoustic reflections from external apparatus; a processor configured to execute instructions stored in the one or more non-transitory memories. The instructions cause the processor receive acoustic images of tubulars and apparatus mounted externally thereto; and convolve the acoustic images with the computer model to output a location of any external apparatus detected.

The computer model may comprise a classifier, regression network, machine learning network or template matching algorithm.

Thus, it is possible, not only to detect apparatus that is not normally visible within the tubular, but also to automate its identification and location determination. Further operations on the tubular may then be performed using the known locations of external apparatus.

BRIEF DESCRIPTION OF THE DRAWINGS

Various objects, features and advantages of the invention will be apparent from the following description of embodiments of the invention and illustrated in the accompanying drawings. The drawings are not necessarily to scale, emphasis instead being placed upon illustrating the principles of various embodiments of the invention.

FIG. 7 is a workflow for identifying apparatus from edge reflections.

DETAILED DESCRIPTION OF THE INVENTION

With reference to the figures, devices and methods are disclosed for scanning, identifying and locating apparatus externally connected to a tubular, which generally have a long narrow form factor, through which the device can move longitudinally. Tubulars may be oil/water pipelines, casing, and tubing. These tubulars often have apparatus mounted externally. Cement may be used to fix the location of the external apparatus and affects the acoustic coupling from the device to parts of the apparatus. Cement or gas trapped by the cement tends to attenuate acoustic energy reaching parts of the apparatus not in contact with the tubular, making the edges in contact detectable by the present device.

Figure 1:
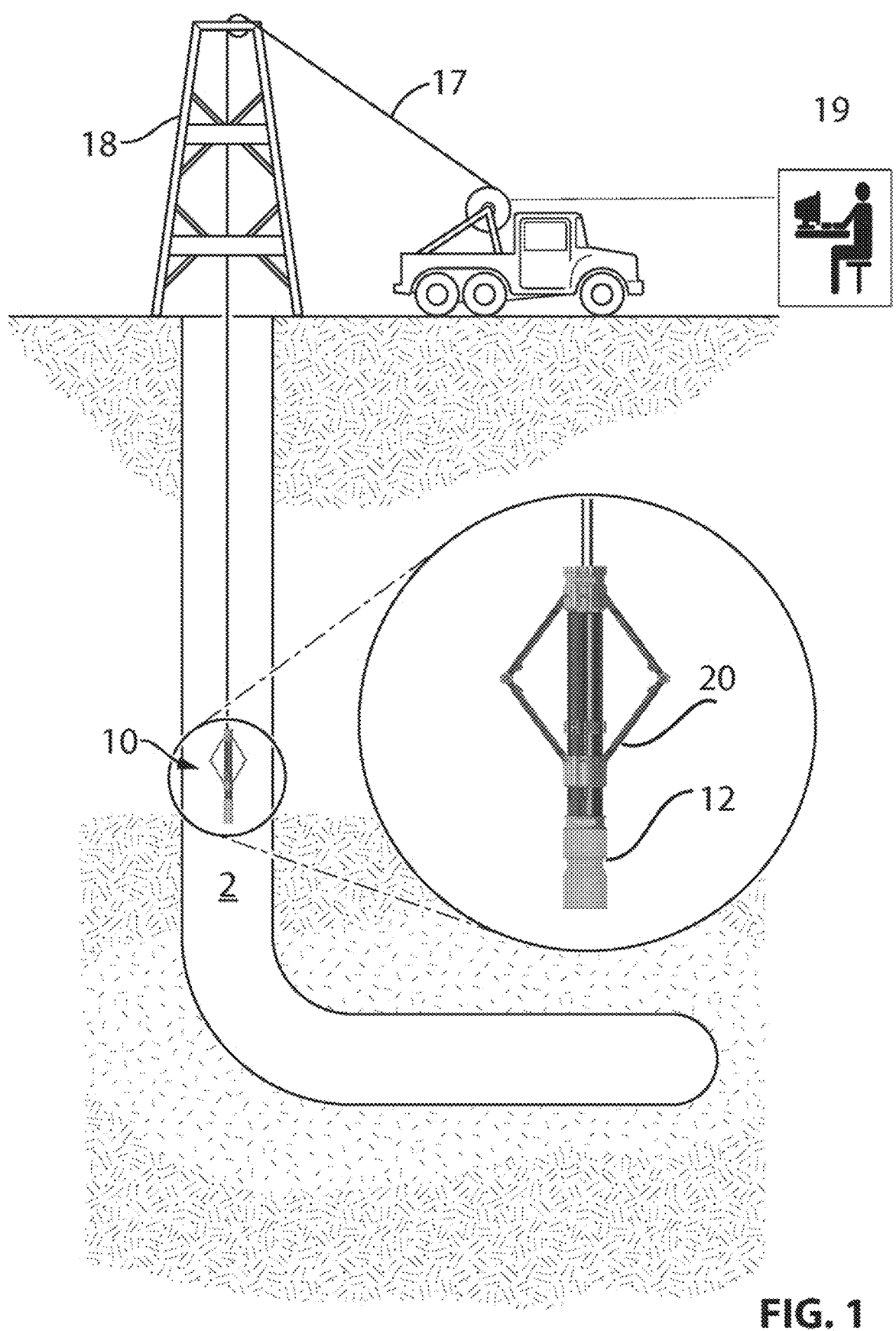
FIG. 1 is a cross-sectional view of an imaging device deployed in a wellbore in accordance with one embodiment of the invention.
Figure 2:
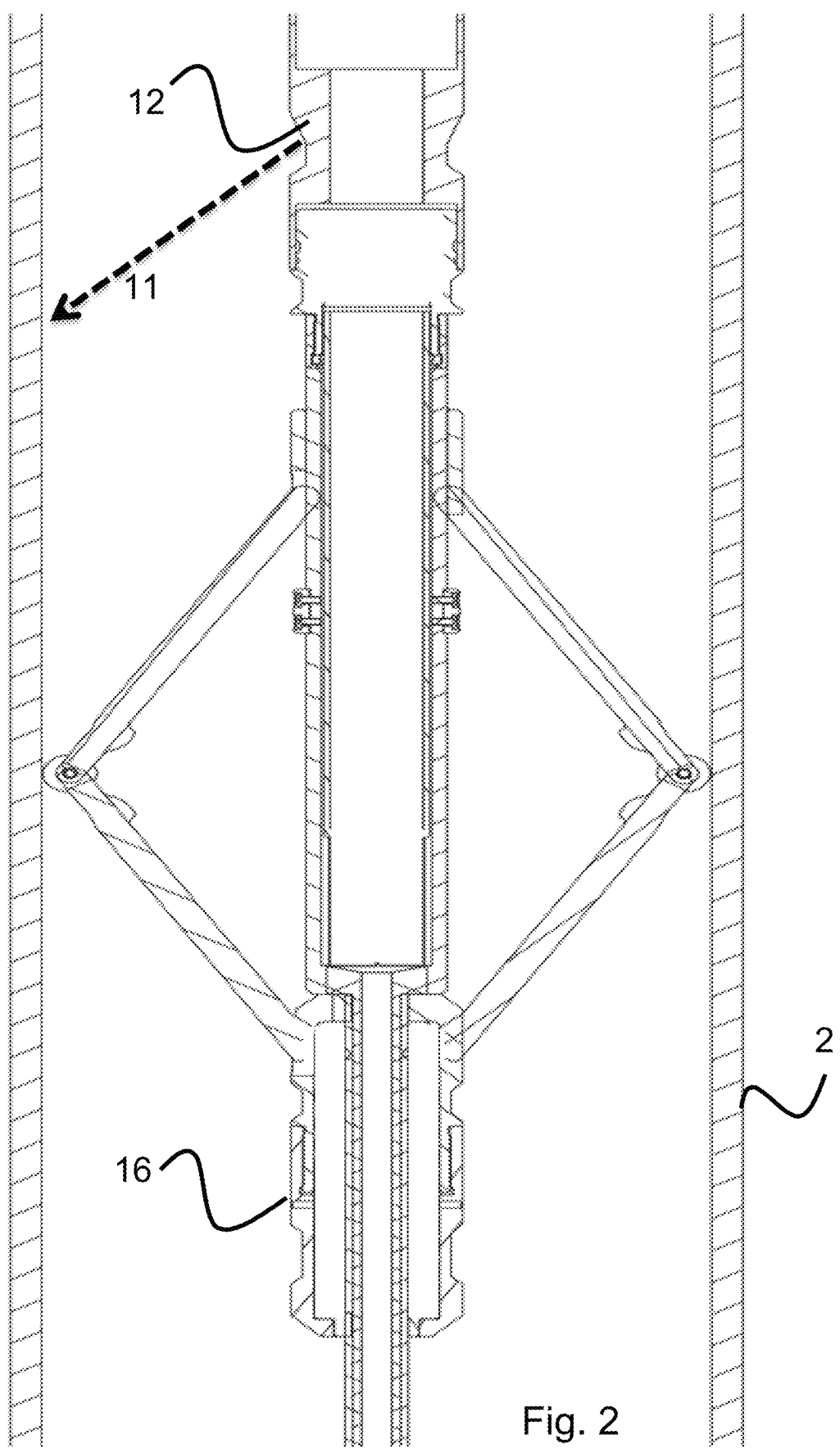
FIG. 2 is a cross-sectional view of a device with radial transducer array in a casing.

In accordance with one embodiment of the invention, there is provided an imaging device 10 for imaging a wellbore 2, as illustrated in FIGS. 1 and 2. The imaging device 10 comprises an acoustic transducer array 12, a body 16, a processing circuit, and memory for storing ultrasound images. The images may be transmitted to a computer 19 located external to the wellbore for processing and for controlling certain downhole operations. Acoustic transducers are desirable in fluid well inspection applications because they can work even in opaque fluids, can be beam steered to change the apparent direction of a wave-front, and can be beam focused to inspect different radii of the tubular, such as behind the outer wall of the tubular. Thus, the imaging device can acquire 3D images of objects at depths behind other objects, in contrast to cameras which capture 2D images of only foreground objects.

The present system is automated using a computer model of apparatuses to identify apparatus in a logged well from ultrasound images. The model may be a template matching algorithm, a geometric or CAD model, or a Machine Learning model. Advantageously, the present system may identify apparatus from ultrasound features that are undetectable to the human eye or visually meaningless. Such ultrasound features include glints, ringing, frequency changes, refraction, depth information, surfaces mating and materials affecting the speed of sound.

The imaging device may comprise spinning head, radial array, or pitch-catch type transducers. The device may be similar to that described in patent applications WO2016/201583A1 published 22 Dec. 2016 to Darkvision Technologies Ltd. Described therein is a device having a linear array of radially-arranged outward-facing acoustic transducers. This conical design may also face uphole, i.e. towards the proximal end of the device and the surface. The array 12 may be located at an end of the device or between the ends. Alternatively, the device may be similar to that described in GB2572834 published 16 Oct. 2019, whereby a longitudinally-distributed array is rotatable and movable within the wellbore.

Transducers

The array comprises a plurality of acoustic transducer elements, preferably operating in the ultrasound band, preferably arranged as a one-dimensional array. The frequency of the ultrasound waves generated by the transducer(s) is generally in the range of 200 kHz to 30 MHz, and may be dependent upon several factors, including the fluid types and velocities in the tubular and the speed at which the imaging device is moving. In most uses, the wave frequency is 1 to 10 MHz, which provides reflection from micron features. Conversely, low-frequency waves are useful in seismic surveying of the rock formation at deeper depths.

The number of individual elements in the transducer array affects the resolution of the generated images. Typically, each transducer array is made up of 32 to 2048 elements and preferably 128 to 1024 elements. The use of a relatively large number of elements generates a fine resolution image of the well. The transducers may be piezoelectric, such as the ceramic material, PZT (lead zirconate titanate). Such transducers and their operation are well known and commonly available. Circuits to drive and capture these arrays are also commonly available.

Radially Configured Sensors

The transducers may be distributed equidistant around an annular collar of the device. As seen in FIG. 2, the array 12 may be substantially outward, radially-facing. The transducer array 12 may be distributed on a frusto-conical substrate with transducers facing partially in the longitudinal direction of the device (and thus in the longitudinal direction when in the well). Thus, the radial transducers are angled uphole or downhole to form an oblique-shaped conical field of view. The cone may have a cone angle $\beta$ of 10-45°, preferably about 20°. In this arrangement, much of the sound wave reflects further downward, but a small portion backscatters off imperfection on the surfaces, voids within the tubular or external apparatus back towards the transducer.

Figure 4:
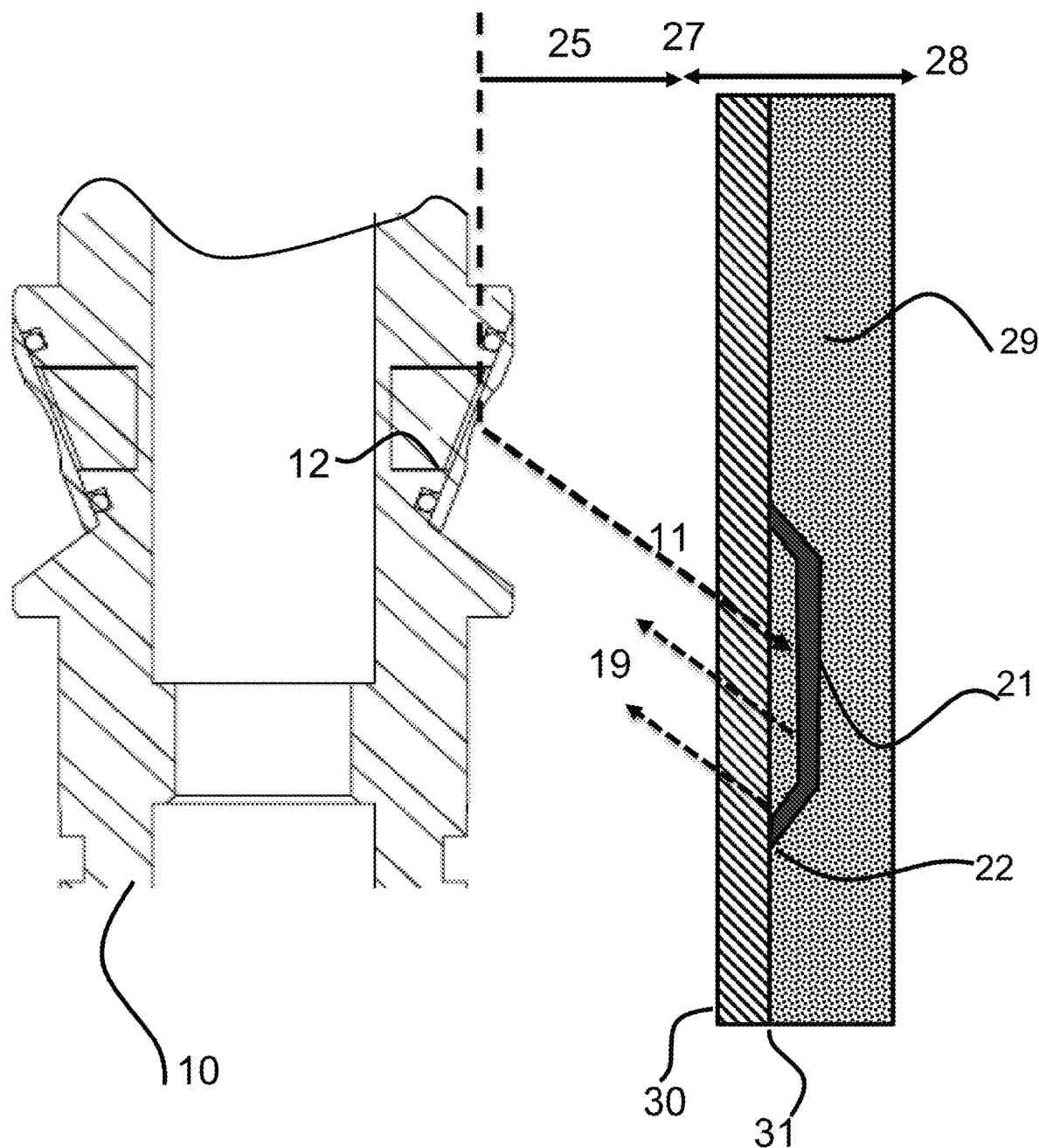
FIG. 4 is a cross-sectional view of the device inspecting a casing and apparatus.

As illustrated in FIG. 4, a scan line 11 is emitted towards the well. A first reflection is received from the inner wall 30 and then a second reflection is received from the outer wall 31. However, there may be multiple reflections as the wave bounces between walls. Additional reflections 19 come from the apparatus 21, particularly at the boundary with the tubular wall 31. The conical transducer arrangement captures a conical slice of the well at multiple azimuths. At each azimuth, the data comprises depth data based on the time that reflections arrive. The scan line data may be reduced to a single brightness value by integrating all the energy (B-mode filtering).

As the device is moved axially in the well, in either a downhole or uphole direction, the transducer continually captures slices of the well and logs a 2D image of the well in the Z-Θ plane.

Compared to the present device, purely radial arrays used for caliper or thickness measurement do not detect external apparatus as well because the apparatus reflections are weak and not significantly different from the expected thickness of the tubular alone.

Scan Frame

An acoustic transducer element can both transmit and receive sound waves. A wave can be synthesized at a location on the sensor array 12, referred to as a scan line 11, by a single transducer element or a set of transducers, called the aperture. The number of scan lines N that make up a full frame may be the same as the number of elements M in the array, but they are not necessarily the same.

Multiple discreet pulses in the aperture interfere constructively and destructively. As known in the art, altering the timing of the pulse at each transducer can steer and focus the wavefront of a scan line in selectable directions. In steering, the combined wavefront appears to move away in a direction that is not-orthogonal from the transducer face, but still in the plane of the array. In focusing, the waves all converge at a chosen distance from a location within the aperture. Preferably, this focal point corresponds to the boundary of the tubular 31 and contacting points 22 of the apparatus 21.

The device comprises a processing circuit for generating and receiving signals from the transducers. The skilled person will appreciate that the circuit may implement logic in various combinations of software, firmware, and hardware that store instructions, process data and carry out the instructions.

The steps of the method are performed by a computer processor and may be described as automated, except where noted as performed by an operator to set up the device and method. The computer processor accesses instructions stored in non-transitory memory. Some instructions are stored in the remote computer's memory with the remote computer's processor. Some instructions are stored in the device's memory with the device's processor to control the operation of the device, its actuators, and high-level scanning steps, while the actual timing of transducers may be left to an FPGA.

Operation

The present imaging device may be operated by an operator using manual controls such as joysticks or using a Graphic User Interface via a computing device. Control signals are sent from the operator's input down the wireline to the device's control board.

The imaging device includes a connection to a deployment system for running the imaging device 10 into the well 2 and removing the device from the well. Generally, the deployment system is wireline 17 or coiled tubing that may be specifically adapted for these operations. Other deployment systems can also be used, including downhole tractors and service rigs.

The device moves through the tubular while capturing radial frames at a plurality of azimuthal scan lines. The transducers sonify the tubular at an angle of incidence of 20-60° measured axially from the surface normal. While a majority of the acoustic energy continues downhole or uphole, away from the transducer, a small amount backscatters off surface features/surface interfaces, and a large amount reflects from edges that protrude sharply from the tubular surface.

In particular, edges of the apparatus that run circumferentially around the tubular (as opposed to axially) form a steep angle with the axially inclined scan line and thus reflect the wave bigly. Conversely, scan lines may only tangentially intersect the plane of axially running edges and thus reflect very little energy.

Figure 5:
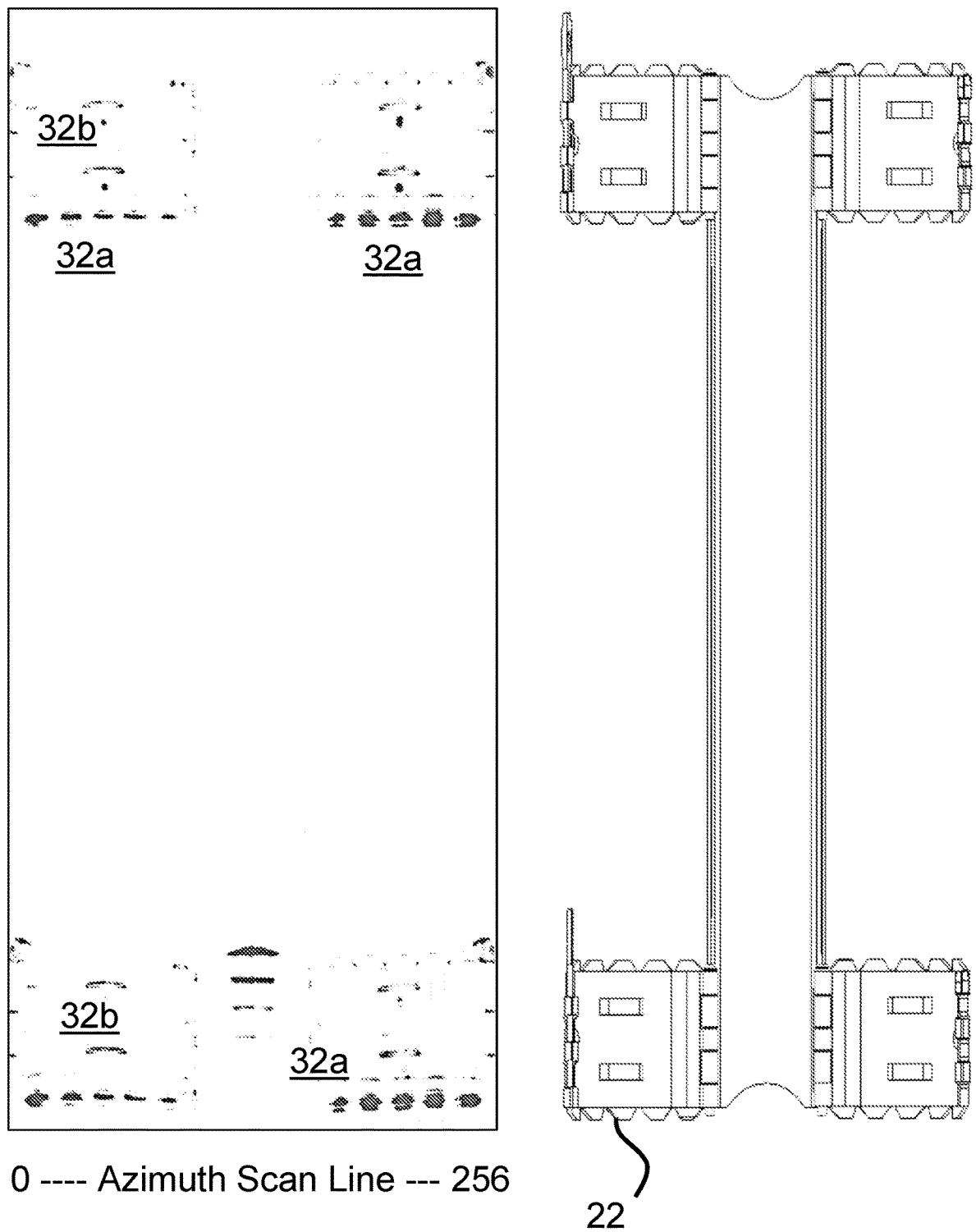
FIG. 5 is a plot of acoustic reflections along a length of a casing vs azimuthal lines (left) beside the corresponding cable protector model (right).

FIG. 5 is a brightness plot flattened for all azimuthal points and corresponds to the cable protector to the right of the same scale. As can be seen, the ten "teeth 22 of the clamp correspond to the brightest features 32a and the mid-clamp indents correspond to weaker features 32b. In both of these cases, there may also be weak reflections from clamp teeth and indent edges that are parallel to the scan line.

Edge Detection

The transducers receive acoustic reflections from the inner tubular surface, outer tubular surface, tubular defects, tubular-apparatus interface, outer apparatus surface, and apparatus edges. To identify the external apparatus and its orientation most precisely, it is desirable to concentrate on external apparatus edges and filter out the other reflections.

The processor may process the reflection data by summing the total reflected energy at each scan line and then determining the scan line where the energy exceeds the average. This averages out the tubular reflections which return generally similar energy. Voids, corrosion, and other damage in the tubular will also create excess reflections, but these form a random pattern that does not correspond to any known external apparatus.

The processor may filter out inner wall reflections by removing the initial reflection, which is typically the strongest signal and occurring at $T_{inner}$ (i.e. the time of flight for waves from the transducer to the inner wall of the tubular and back).

Alternatively, reflections from the tubular may be filtered out by ignoring signals arriving before a threshold time $T_{outer}$, where $T_{outer}$ is the time of flight for waves from the transducer to the outer wall of the tubular and back. This threshold may be set by the operator based on expected fluid properties and tubular diameter or may be automatically set by the processor based on the observed average time of reflections from the outer wall of the tubular. The remaining signals correspond to the edges and outer surface of the apparatus.

The filtered data form pixels at azimuth and axial positions $\Theta$, Z (the radial component may be ignored as the apparatus is deemed to be located at the outer radius of the tubular) to create a very long 2D ultrasound image. The image may then be processed to find candidate edges using known edge detection algorithms. Common edge detection algorithms include Sobel, Canny, Prewitt, Roberts, and fuzzy logic methods. The output is a set of locations and vectors of edges, optionally with brightness values.

The edge detection algorithm may be tuned for edges found in the set of downhole apparatus to be identified. For example, only edge candidates of certain length, curvature, aspect ratio and brightness are considered for further processing. This may filter out tiny defects, large features that run the whole tubular, or 2D patches that correspond to surface textures.

Indeed, edge detection algorithms may also be used to filter the raw reflection data because surface features are usually not contiguous enough to form an edge and surface interfaces are generally planar and not edges.

In FIG. 5, the brightness values are taken from reflections after the tubular to filter out tubular features. There are also point reflections from other surface artefacts that are not treated as edges because they are too small and do not connect to form a coherent edge.

Cement Bond Detection

The external apparatus is typically enveloped in the cement used to surround the casing and hold the casing to the open borehole. The bond quality of the cement and the presence of mud instead of cement between the apparatus and casing is of concern to operators. The present method may be used to output a metric for the bond or determine the presence of mud/cement based on the reflections returned from within the boundaries of the apparatus edges. So, although the method initially looks for bright reflections to determine apparatus edges, additional reflection signals within the edges are useful too.

Cement is highly attenuative, so its presence between the apparatus and the casing via a quality bond will not return much acoustic energy. Conversely a poor bond leads to a discontinuity between the cement/casing or cement/apparatus surface which creates reflections over that patch of discontinuity. Thus, the lack of cement may be an indication of the presence of the clamp. The shape and size of the missing cement reflections should be related to that of the clamp and detectable by the computer model.

Conversely, mud between the apparatus and casing will efficiently carry the acoustic signal then reflect off the surface of the apparatus. These reflections arrive after the inner and outer casing reflections.

Identification

The processor operates on the ultrasound image using a computer model of apparatuses to locate and determine azimuthal orientation automatedly. The model may employ template matching, classification and/or regression.

Figure 3:
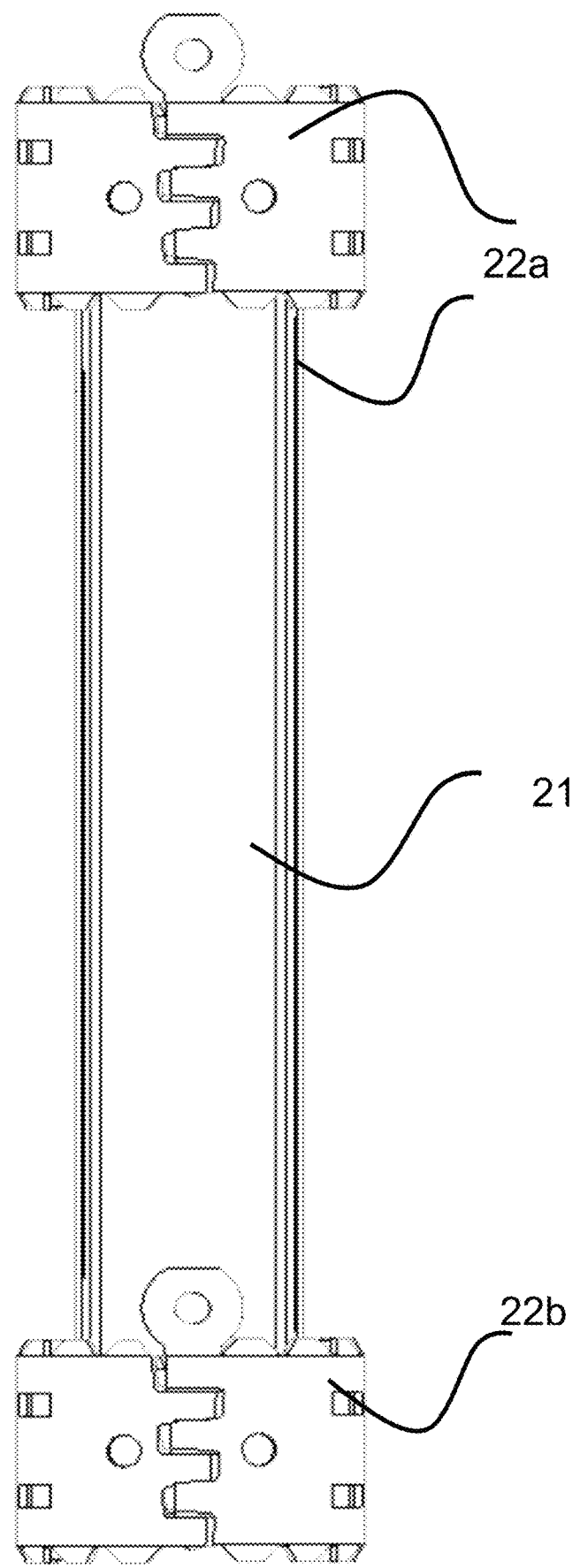
FIG. 3 is a side view of a cable protector in a closed position.
Figure 6:
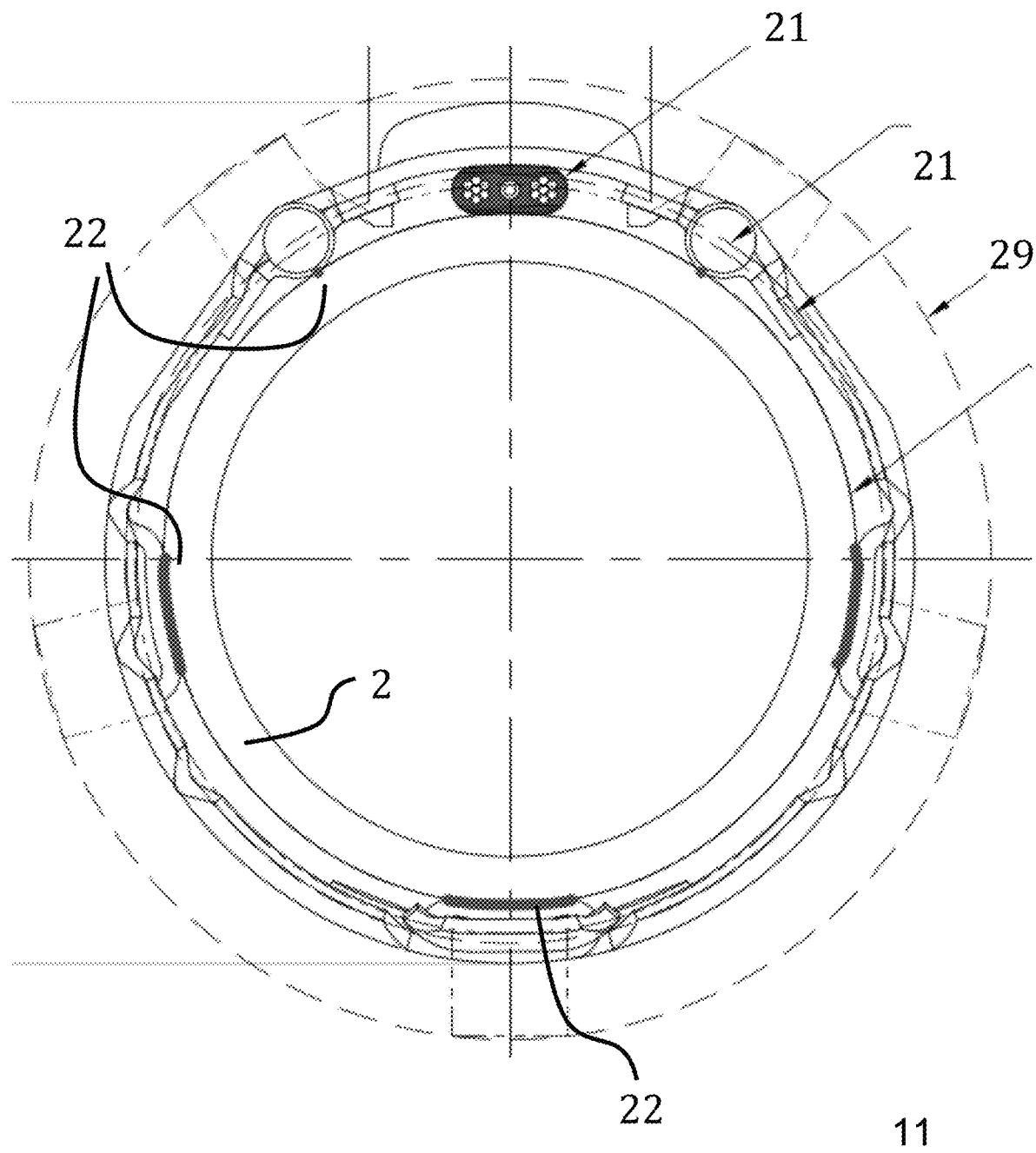
FIG. 6 is an end view of a cable protector cemented in place on a casing.

In one embodiment the identification, location, and orientation of the apparatus may be determined from a set of at least two clustered edges to exceed a threshold probability. It has been found that at least two proximate edges are useful to identify an apparatus feature and at least two apparatus features are useful to identify the apparatus. An edge is determined by a set of largely contiguous pixels above a threshold signal and an apparatus feature. The processor further checks that the apparatus features are within a threshold distance of each other, based on the size of the apparatus (e.g. if the largest apparatus in the library is 2 m long then only features within two meters of each other are co-considered). For example, the cable protector 21 of FIG. 3 may be defined by four features: two upper strap arms and two lower strap arms. A single strap arm feature may be defined by edges from contact teeth 22a and indents 22b (see also bold contact lines 22 in FIG. 6).

The output may include a calculated probability that the correct apparatus is identified, its location in the well and its orientation with respect to the tubular. The processing requirements may be reduced if the type of apparatus in the well is already known, whereby the output simply confirms that the expected apparatus corresponds to the detected edges.

The processor may combine several identified apparatuses in the well to determine a twist in tubulars, apparatus clamping condition, and cable trajectories. These may be added to a WellCAD model.

In certain embodiments, the processor applies a machine learning (ML) model to the ultrasound image. Because a well is typically several thousand meters long, the ML model is applied to smaller selected image regions. The ML model returns whether that image region contains an apparatus or not, or the most probable location of an apparatus within the image region.

Without loss of generality the ultrasound image may be 3-dimensional, in which case the exemplary neural nets provided herein below have an extra dimension to convolve. However, to reduce processing time, the ultrasound image may be a 2D image with depth (z) and azimuthal (Θ) coordinates, as discussed above.

The ultrasound image may be convolved with a Neural Net to output a probability that an external apparatus exists and where it is located within the well. The inventors have found that a Convolutional Neural Net (CNN) is desirable because they are largely spatially invariant and computationally efficient, especially when run on a GPU or TPU (tensor processing unit). CNN architectures of the types used in RGB image processing to identify common objects may be used with some modifications to work on ultrasound "pixels" in circular images to identify apparatus. Modifications to their training are also provided below.

As a tubular is typically hundreds of meters to kilometers long, there are typically hundreds of apparatus to detect. The system may thus maintain a database of detected apparatus, their identity (assuming various types exist on this tubular), their global location (z and Θ), and confidence(s) of the computer model's output(s). Further processing may de-duplicate entries for apparatus that overlap or are within a set distance of each other.

Region Selection

Figure 8:
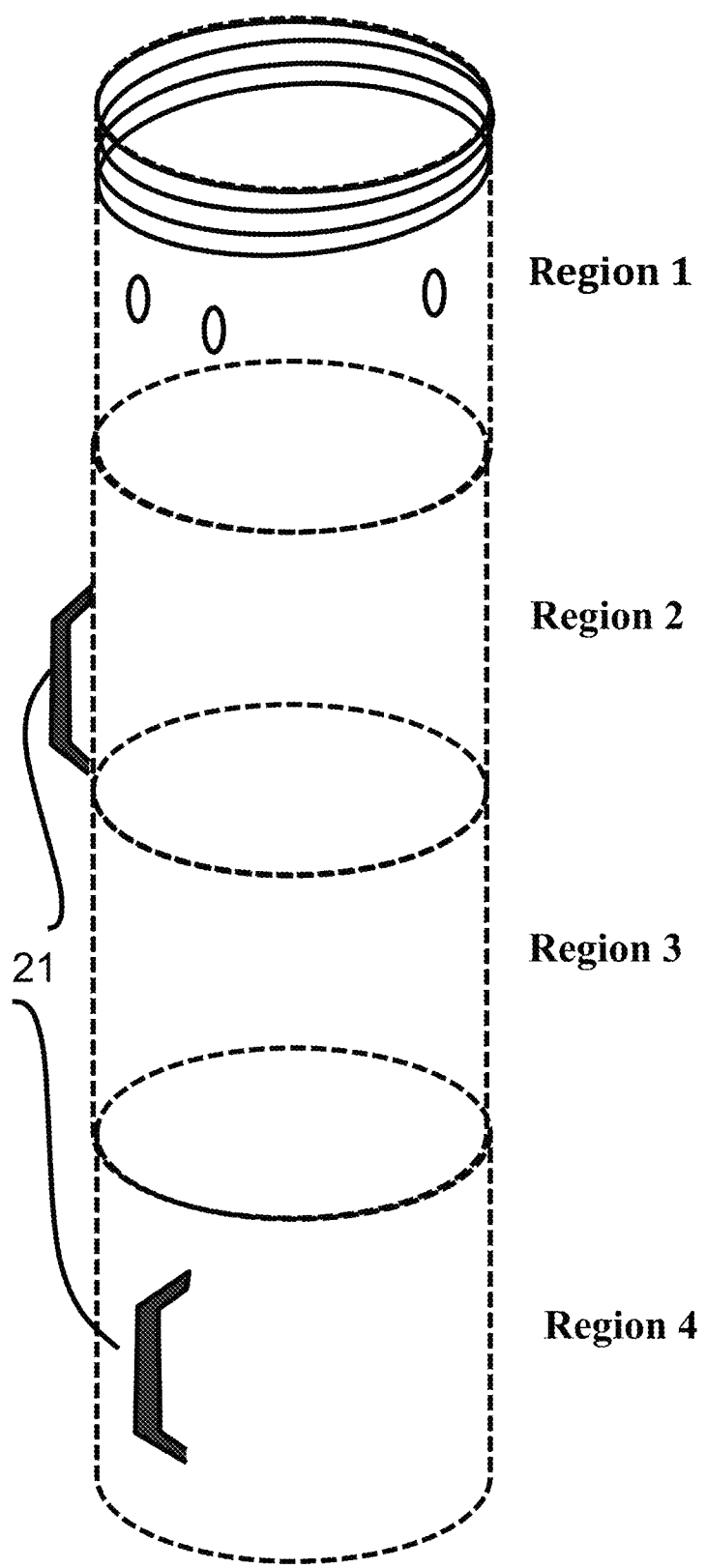
FIG. 8 is an illustration of regions of a casing selected for processing.

Region selection may be the result of limiting acoustic scanning to a region of interest based on a prior information about the likely location of apparatuses in the well. The region of interest may be known from the well plan layout or from a previously detected apparatus in a chain of apparatuses (e.g. fiber clamps connected 3 m apart in a production tubular 2000 m downhole). This approach might select Regions 2 and 4 in FIG. 8.

Alternatively, regions from a larger well image may be automatically proposed for apparatus detection. A simple filter may be used to scan the well image quickly with a lower threshold for object detection. For example, in a long tubular largely devoid of edges or external reflections, any significant edge or external reflection makes the surrounding region a candidate for further apparatus locating. This filter may be a Region Proposal Network (RPN), such as R-CNN (Region Proposal CNN) or Faster R-CNN (see arxiv.org/abs/1506.01497). An R-CNN uses simpler and fewer filters with larger stride to detect objects, without attempting to classify objects with high recall or precision. This approach might propose Region 1, 2 and 4 in FIG. 8 (where Region 1 contains perforations and threads that create glints).

A second alternative is to segment and select all regions systematically for the whole section of the well of interest. For example, a section of production tubulars from depth 2000 m to 2100 m might be segmented into 1 m lengths axially. This approach might select all Regions 1-4 in FIG. 8.

The image size of the region selected for processing preferably relates (in terms of pixels) to the size of the GPU that can be stored for efficient matrix operations and relates (in terms of physical units) to the size of the apparatus. These are both related by the ultrasound scan resolution (pixels/mm or pixels/radian). In preferred embodiments, a region may be from 50 cm to 2 m axially, or may be 200-1000 pixels in either azimuthal or axial dimensions (not necessarily a square).

Figure 9A:
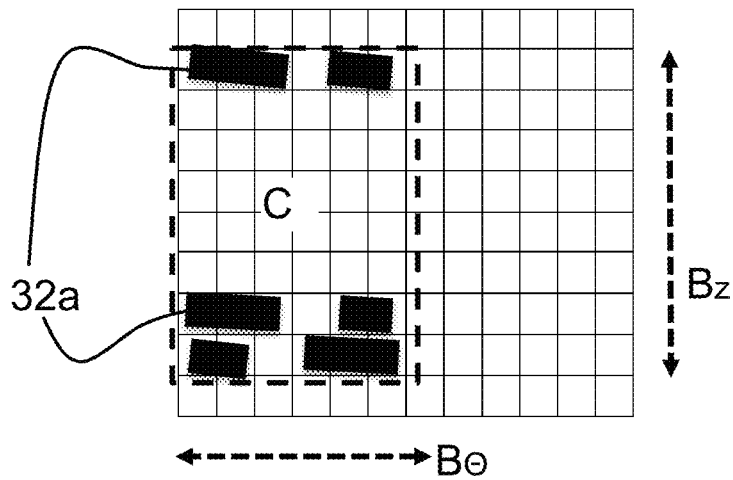
FIG. 9A-C are ultrasound image regions containing external apparatus.
Figure 9B:
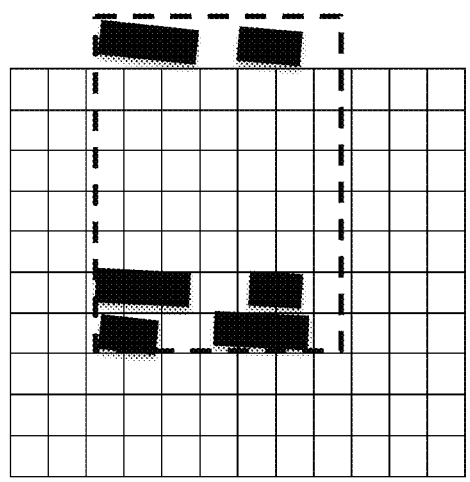
Figure 9C:
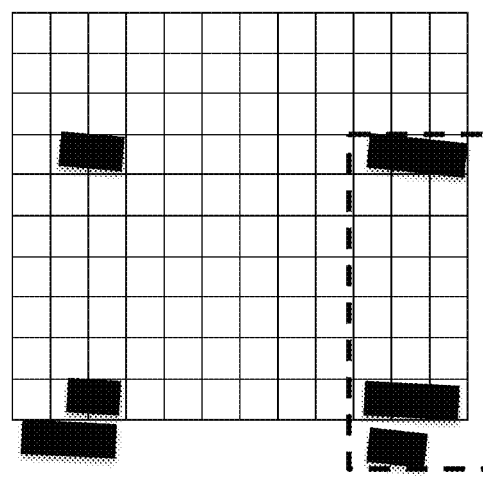
Figure 10:
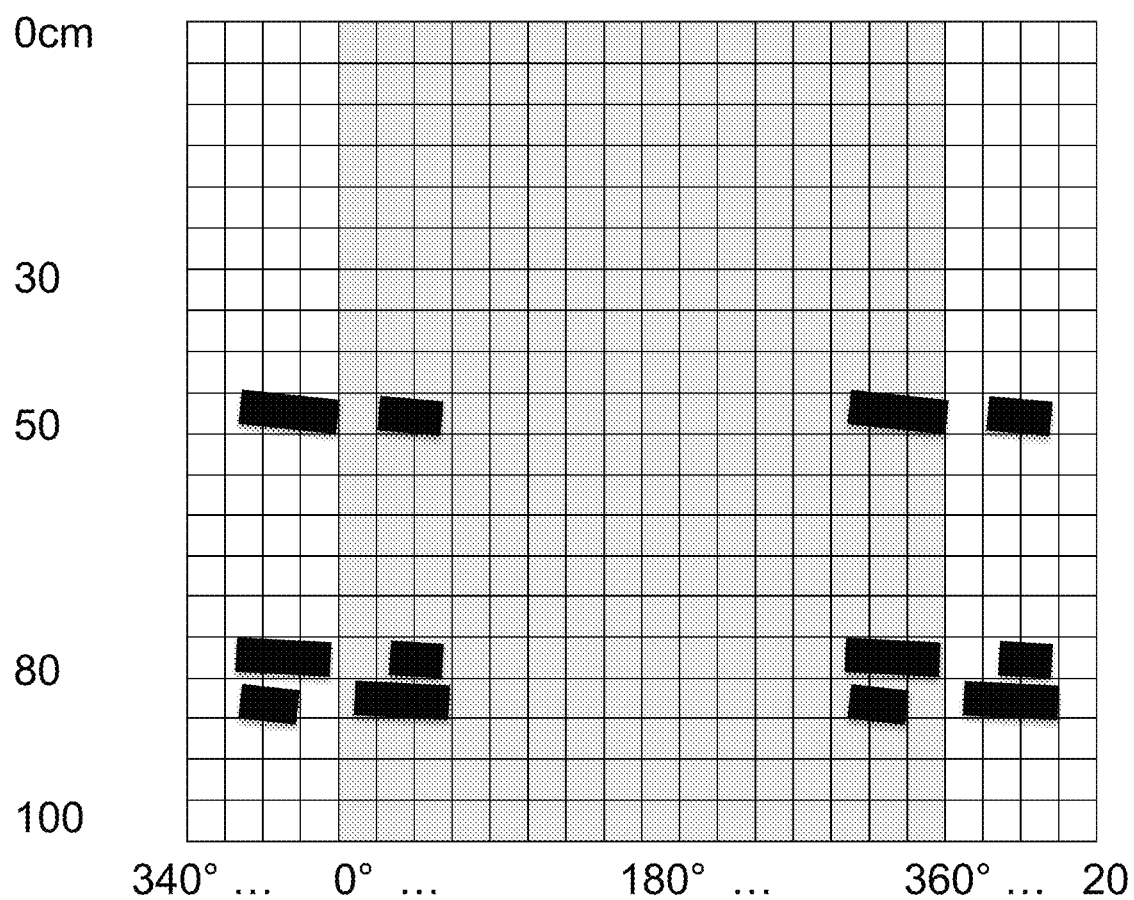
FIG. 10 is an ultrasound image with wrap-around padding.

For gross simplification, FIGS. 9A-C illustrate a region of 10×12 pixels or 1 m×360°, so a pixel is 10 cm×30°, which is 10 times courser than in preferred embodiments. The black rectangles 32a are a simplification of the clamp captured in the real image of FIG. 5 using some input representation for intensity and pixel geometry. The model output is preferably some probability or classification of any apparatus within the input image.

For example, the output location may be a bounding box defined by a center ($C_z$, $C\Theta$), box height ($B_z$ in mm) and box width ($B\Theta$ in radians or degrees). These will be in local coordinates of the selected region, which are then converted to global coordinates. Detected apparatus and their global locations are recorded in a database. The processor de-duplicates apparatuses with overlapping locations. This may be initially be done in the local image region using the Intersection over Union (IoU) method, on the premise that two apparatuses cannot overlap, optionally de-duplicating with the stricter premise that two apparatuses cannot be located in one image region. Similarly, de-duplication occurs at neighboring image regions, where overlap is determined based on global coordinates.

In FIG. 9A the apparatus is perfectly enveloped by the selected image region, enabling the CNN to identify an object of class A confidently, and its dotted bounding box defined by local coordinates: $C_z$, $C\Theta$, $B_z$, and $B\Theta$. In FIG. 9B, the apparatus is slightly outside of the region, so the CNN may identify an object with less confidence but still apply a bounding box, which extends past the region. This bounding box will be deduplicated with any box identified in the region above this, once global coordinates are considered. FIG. 9C represents a more difficult case, where the apparatus is both partially outside of the region and wrapped around the edges in this 2D representation. This bounding box could equally be drawn at the left side due to the circular coordinates.

Input Representation

In the preferred system, the input data is represented in three main axes: Θ, R and Z (the Z axis is also the logging axis separated in time by frames; R is the cross-sectional distance from the transducer array, measurable in time-sampled pixels or radial distance; and Θ corresponds to the azimuthal angle of scan line). Here, the Θ-R plane represents data collected from a cross-sectional slice of the well at a specific depth (z) or logging time instant (t). One efficient representation is averaging the intensities over R for each scan line in the Θ-axis. Hence, the entire well or pipe can be represented by a 2-dimensional stream of 2D segments in the G-z plane, where every pixel along the Θ-axis at a given z, represents averaged line intensities. The size of the image to process may be based on the estimated apparatus size.

Alternatively, the image may be represented by scan line features, such as intensity standard deviation or intensity center of mass. A preferred representation provides a good compromise between spatial and temporal features by averaging intensities along sub-regions along the R-axis on three separated planes. For example, the regions may be the reflections before the inner surface, reflections within the tubular itself, and reflections beyond the outer surface. Hence, instead of converting the well image from R-Θ-z to 1-Θ-z, the system converts them to 3-Θ-z. In the exemplary systems below, the R-Θ-z to 1-Θ-z representation is used, using a single dimension to represent average intensity value per scan line.

Template-Matching

In this embodiment, the system formalizes the apparatus orientation/detection as a classification problem. A goal is to detect whether each segment of tubular image contains a given apparatus type, and if so, classify the mounting orientation of the apparatus around the tubular. Different classes correspond to different shifts of the apparatus template along the Θ-axis. Since apparatus can come in different shapes, the operator preferably indicates or loads a template of the current apparatus expected in the tubular under investigation. The first step is to divide the tubular image into image segments, z-pixels high. Here the value for z should be enough to envelope an apparatus or a major feature of the apparatus. Signals of each image segment may be normalized, scaled, and converted to 1-Θ-z representation to generate an input image. Then the system detects whether the current image segment contains the given apparatus. This can be done by applying cross-correlation between the input image and shifts of the apparatus template. The shift may be on a pixel-by-pixel basis or shifting P pixels per calculation, searching and moving towards maximum cross-correlation.

In another embodiment, a processor performs template matching by comparing a set of identified edges to sets of model edges in a library of apparatus. Here each apparatus is associated with a set of model edges defined by shape, orientation, brightness or aspect ratio and their weighting. These model sets may be created from geometric measurements and CAD models considering the size of edges that contact the tubular and angle of these edges with respect to the scan line angle (i.e. brightness may change with incidence angle). These model sets may also be created by scanning multiple apparatus specimens, extracting edges and averaging them over repeat scans of the same specimen.

For example, the processor may use template matching by sliding the identified set of edges over the set of model edges to find the best fit. Known techniques include cross-correlation and SAD (Sum of Absolute Differences). The technique may compute the dot-product of edges in the set of identified edges with the set of model edges of any apparatus in the library. The technique then selects the relative spacing and orientation where this value is highest.

For example, if a higher than threshold cross-correlation is detected for any of several coarse shifts of the template along the Θ-axis, an apparatus is detected but with poor orientation confidence. To determine the orientation of the detected apparatus, the system constructs the cross-correlation value as a 1D vector, where each entry corresponds to the value of the cross-correlation for a fine template shift. Thus, the system can find the peak of the values of this vector and determine the apparatus orientation for the image segment.

Machine Learning Model

The apparatus identification may use a two-stage approach: apparatus orientation prediction using a CNN Apparatus detector module followed by a ResNet-based feature extractor and regression network.

Figure 11A:
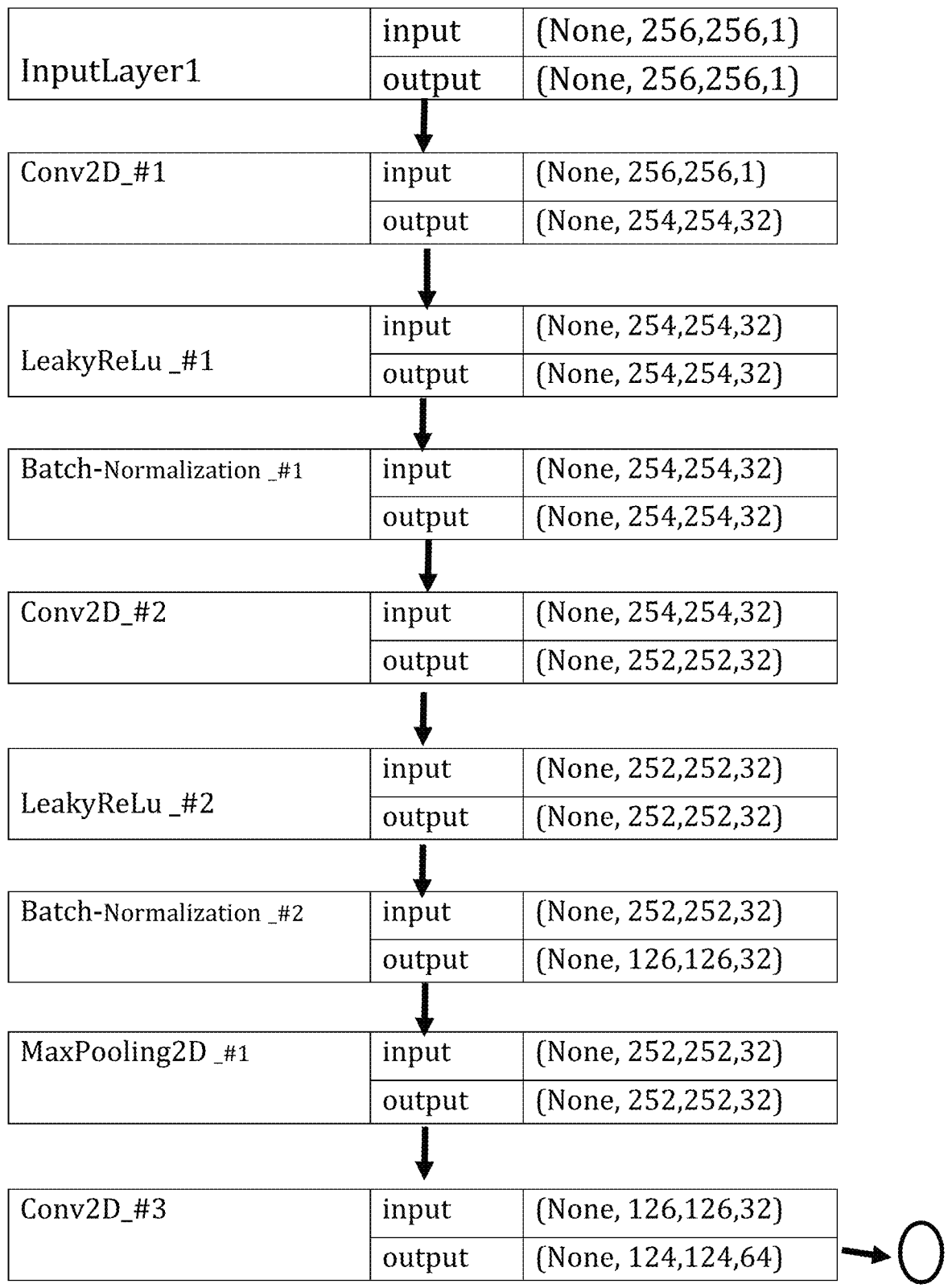
FIG. 11A is a diagram of a first portion of an architecture for a Convolutional Neural Net.
Figure 11B:
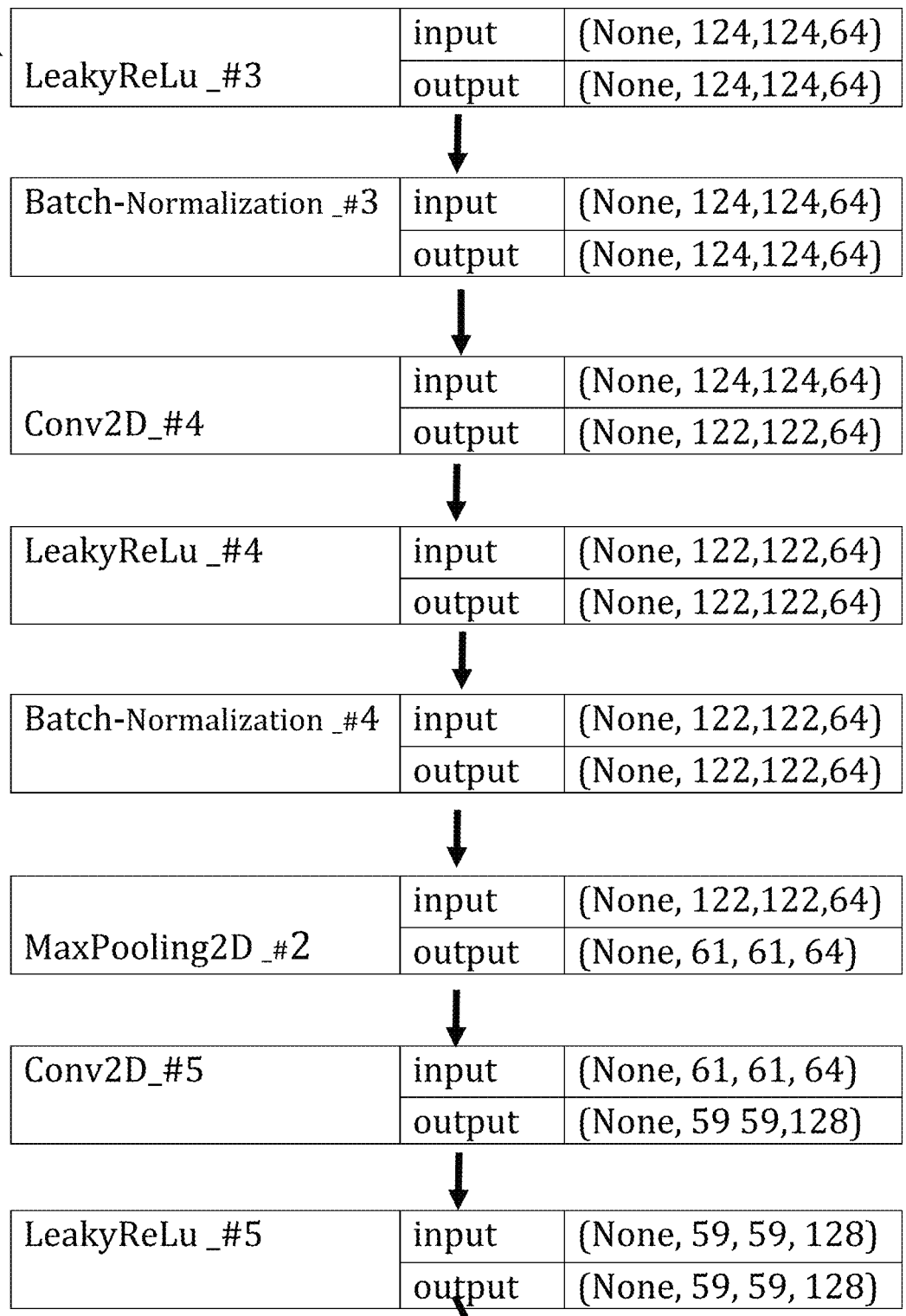
FIG. 11B is a diagram of a second portion of the architecture in FIG. 11A.
Figure 11C:
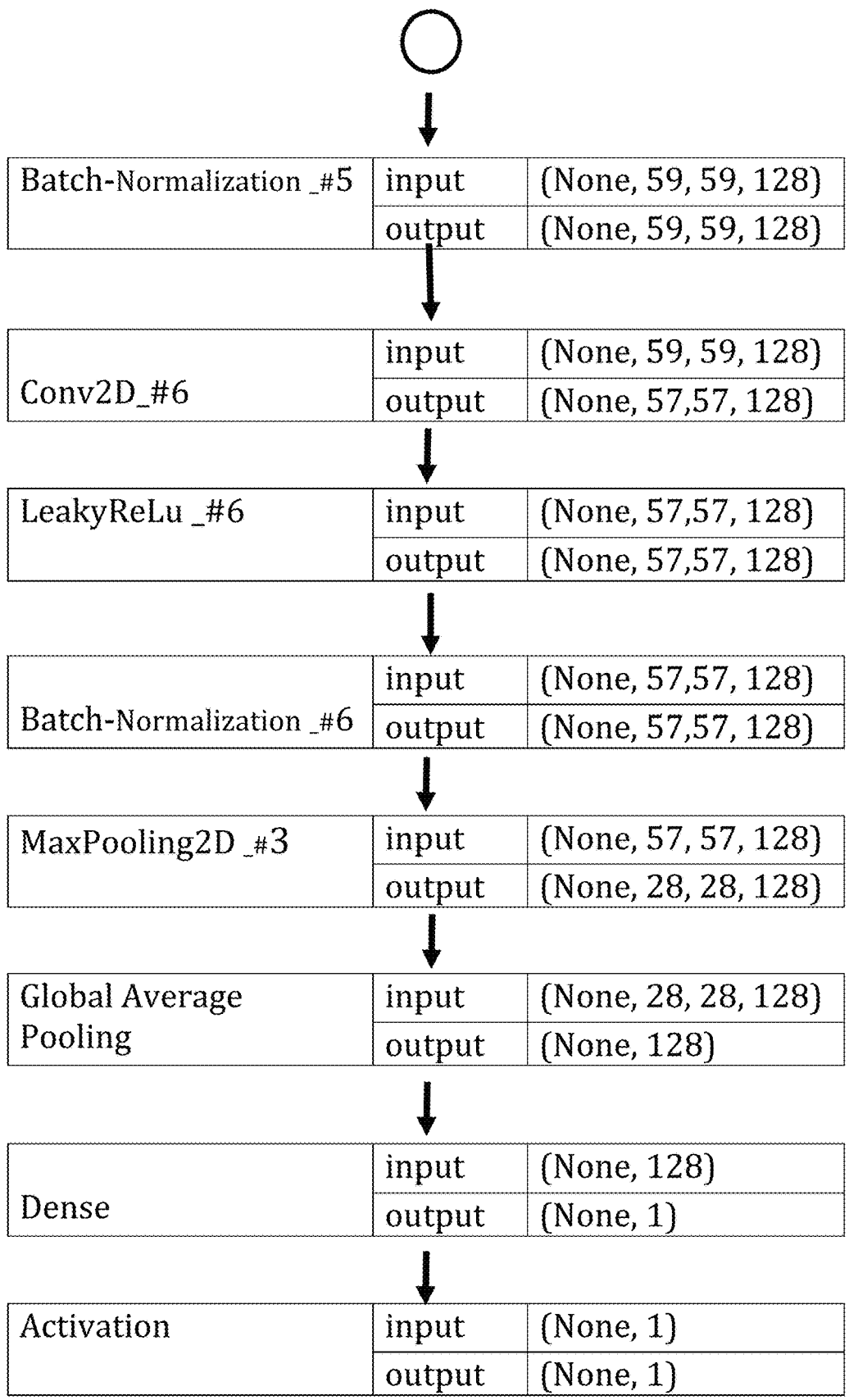
FIG. 11C is a diagram of a third portion of the architecture in FIG. 11A.

The model presented in this embodiment divides the problem into two main tasks. The first is apparatus detection and the second is classifying the orientation of the detected apparatus. FIG. 11 depicts an exemplary CNN architecture for apparatus detection. The neural network learns a decision boundary separating apparatus images from non-apparatus images. The input to the apparatus detector network is a gray-scale image (e.g. 256z×256Θ×1). The network comprises four convolutional layers that capture feature maps with increasing levels of abstraction. For activation functions, the architecture uses ReLU, preferably Leaky Rectified Linear Units (ReLU), to overcome the problem of vanishing gradients which is associated with Sigmoid activation functions. Moreover, Leaky ReLU is preferred over basic ReLU because it prevents the model from getting stuck in the negative region of the ReLU function during the training process. In addition, using Randomized ReLU activation increases the number of trainable parameters, which is not preferred especially if the training dataset is small. The architecture further employs a Batch Normalization layer, which normalizes and scales the input feature maps to each convolutional layer. Batch Normalization layers help in speeding up the training process and reduce the possibility of the model overfitting the training data. Because Batch Normalization helps reduce overfitting, the model does not need Dropout layers.

The architecture also uses Maximum Pooling layers to reduce the dimensions of output feature maps after each convolutional layer. Most conventional CNNs use stacked convolutional layers with increasing depth to extract relevant features and this is followed by two or three Fully Connected layers. In preferred embodiments, the system does not use Fully Connected layers except for the output decision node to avoid overfitting the training data.

Global Average Pooling (GAP) can be used with 3D tensors with varying width and height to 2D tensors, thus effectively reducing (Height×Width×Number_of_feature_maps) to (1×1×Number_of_feature_maps). The architecture may use a GAP layer instead of Fully Connected layers to help the model generalize better for unseen examples. Also using GAP forces the feature maps to be interpretable as they are one step away from the output decision node. Finally, a decision node is used with a Sigmoid activation function. The architecture may employ an Adam optimizer for training the apparatus detector, as it is easier to tune than a stochastic gradient descent optimizer. A stochastic gradient descent with momentum is also an alternative, A learning rate schedular is used to reduce the learning as a function of the current training epoch. The loss function for the optimizer in the case of apparatus detection is the binary cross entropy function. Moreover, the evaluation metric is the weighted accuracy based on the distribution of apparatus and non-apparatus examples in the training dataset.

Certain embodiments of the model may use skipping connections (also called residual units) resulting in two important enhancements. First, by providing alternative shortcuts for gradients to flow during backpropagation, the problem of vanishing gradients is almost eliminated, Second, by incorporating skipping connections, the model is forced to learn an identity function ensuring higher layers perform at least as good as lower layers, hence higher layers never degrade the performance of the model.

Once the system has detected an apparatus in the image segment, the system determines the orientation of the apparatus. The system may treat this problem as a regression problem, where the input of the network is an image segment containing a clamp and the output is an orientation value in the continuous range from 0 to S scan lines (e.g, the 256 scan lines in the input image). Later, this output can be scaled to the [0, 360°] range. An alternative but less accurate embodiment formalizes the problem as a classification task, where the output layer corresponds to 256 classes (discrete).

The system initially builds a training dataset of apparatuses with different orientation angles, intensities, geometry and sizes. The training set may be generated by data-augmentation of collected, labelled ultrasound images ('apparatus', 'no apparatus') by shifting while wrapping around the collected data in Θ and estimating the new label based on the initial label and the amount of rotation in Θ (azimuthal variation). The training set may also comprise augmented images flipped around an axis, changing the brightness and the contrast of the image, without affecting the estimated label.

Figure 12:
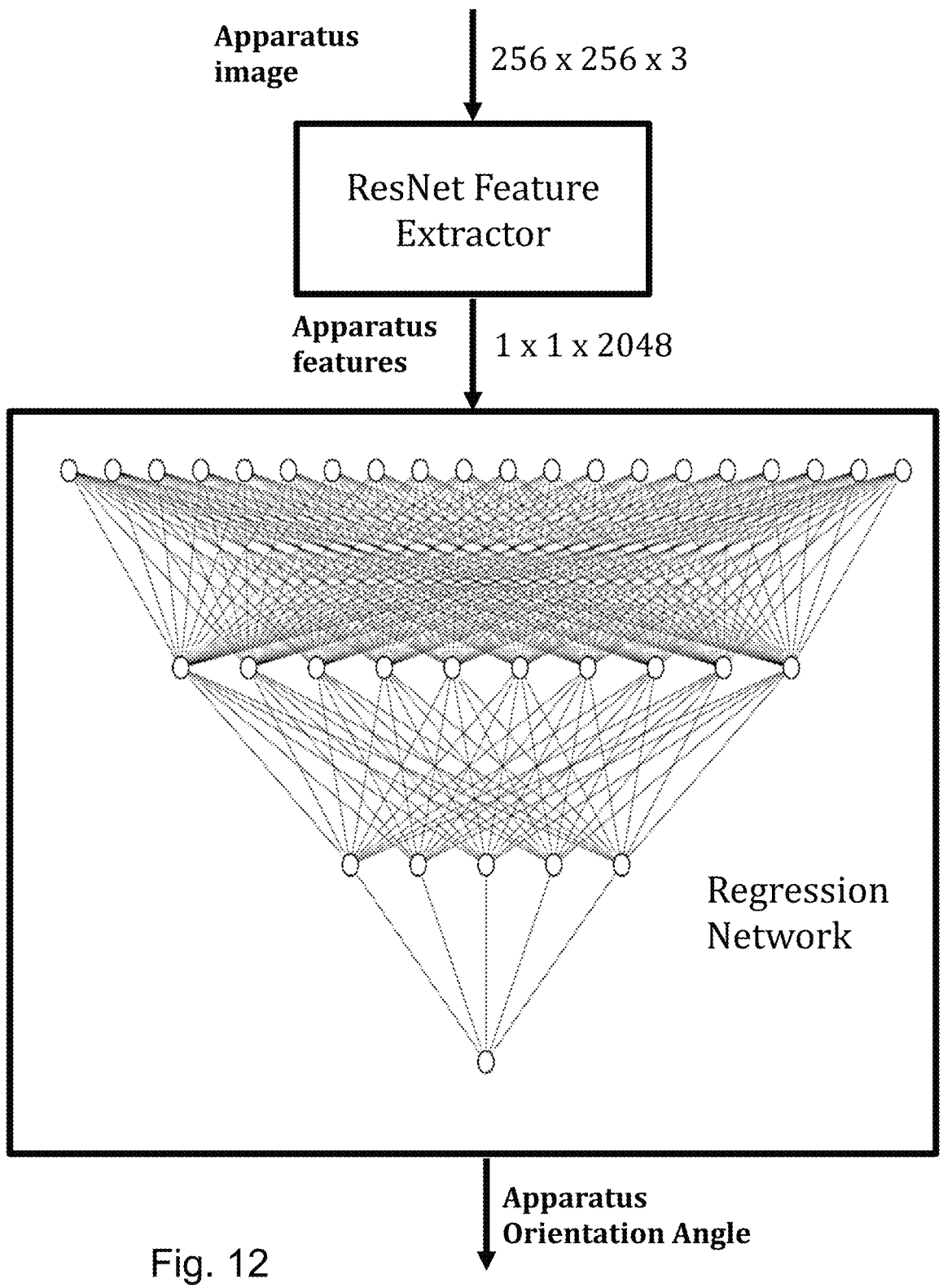
FIG. 12 is a diagram of a regression network.

Additionally, the system may use a ResNet architecture to extract important features. This approach takes advantage of Transfer Learning by loading the 'ImageNet' weights to extract important features from a small dataset of apparatuses, then removing the top layers since they are more related to specific classes of objects from the Image Net dataset and were trained on a classification task rather than a regression task. ResNet architecture expects a three-input channel image, hence, the processor may stack the (256×256×1) grayscale image to construct a (256×256×3) image. The ResNet network maps the (256×256×3) input to (1×1×2048) features. The output features are then passed to a regression network consisting of multiple hidden units. The choice of the number of hidden layers and the depth of each layer can be decided using a grid search approach. FIG. 12 depicts one possible regression network for apparatus orientation prediction.

After initializing the weights of the ResNet feature extractor with ImageNet weights, there are two preferred options to train this network. The first is to freeze the weights of the ResNet feature extractor, hence, backpropagation will not update these layers and will only update the weights of the top fully connected layers. This approach is most suitable in cases where there is a very small dataset. The second approach is to train the entire network including the ResNet feature extractor but with varying learning rates depending on how deep the layers are relative to the input layer. Specifically, weights associated with layers closer to the output node are updated with a higher learning rate compared to layers further away and closer to the input node. The low-level features, like edges, are relevant to all objects and therefore the system should not update those kernels as much as it updates high level features that are unique to specific tubular objects imaged using ultrasound, Since this is a regression task, the system may optimize the loss function based on mean-squared error.

Instead of treating the problem of clamp orientation as a two-step process, first detecting the presence of a clamp and then determining its orientation, the system may comprise a single end-to-end regression network. In this case, the input to the learner is a segment (i.e., could either contain a clamp or not) and the output is a real-valued integer. During the labelling phase, every clamp segment would be assigned an orientation angle in the range [0, 360], while segments that do not contain clamps would be assigned a large negative value so that the mean-squared error loss function is heavily penalized when a clamp is misclassified as a non-clamp or vice versa.

Orientation and Location

The device comprises instrumentation to determine the orientation and location of the device in the well. The instrumentation may include a 3-axis compass, 3-axis accelerometer, and measurement of deployed wireline. Thus, the determined orientation of the external apparatus relative to the transducers can be transformed to coordinates relevant to the well and its operators. These coordinates may then be used to visualize the apparatus for a known depth in the well or used with tools subsequently deployed to operate on the well.

Perforation Gun Operation

In one application, an acoustic device may be used in conjunction with or connected to a downhole perforation gun. A perforation gun operates by moving on a drill string to various axial locations in the production portion of a wellbore and fires numerous charges to make holes through the casing, in order to allow fluids to pass therethrough. The orientations of the perforations may be controlled by the perf gun, particularly to avoid fiber optic cables and control cables. By identifying the location of cable protectors and their orientation, the location of the cable can be estimated to run therebetween. The identified apparatus location is input to the controller of the perforation gun to set a firing orientation and depth in order to miss the determined apparatus or its associated cables.

The invention claimed is:

1. A method of locating apparatus mounted external to a tubular, the method comprising:
deploying an imaging device having an acoustic sensor into the tubular;
creating acoustic images using the acoustic sensor from acoustic reflections from the tubular and portions of the apparatus contacting the tubular; and
processing the acoustic images with a computer model to determine a location of the apparatus; and
outputting the location of the apparatus.

2. The method of claim 1, wherein the acoustic images extend longitudinally along the tubular and circumferentially around the tubular, the image further comprising depth data representing time of reflections into the tubular for each scan line.

3. The method of claim 1, further comprising converting acoustic reflections to one or more intensity features of the image that represent at least one of: maximum intensity, average intensity, standard deviation of intensity, average intensities for plural radial ranges, or radius of center of intensity.

4. The method of claim 1, wherein the acoustic images to be processed are axially-segmented frames from the imaged tubular.

5. The method of claim 1, wherein processing the acoustic images comprises image processing to identify edges of the apparatus.

6. The method of claim 1, further comprising determining an azimuthal location of the apparatus with respect to the tubular.

7. The method of claim 1, further comprising creating a database of apparatus locations, the database storing their parameters and their locations, and de-duplicating the located apparatuses in the databased based on a comparison of the apparatus locations.

8. The method of claim 1, wherein the computer model comprises one or more of a machine learning classifier and a Convolutional Neural Net (CNN).

9. The method of claim 1, further comprising training a classifier of the computer model with a set of labelled training images of tubulars.

10. The method of claim 1, wherein the computer model comprises a regression network to output a value for azimuthal location of the apparatus on the tubular.

11. The method of claim 1, wherein the computer model comprises a store of templates of potential apparatuses to be located and a template matching algorithm.

12. A system for locating apparatus mounted external to a tubular, comprising:
 an imaging device deployable into the tubular and comprising an acoustic sensor;
 one or more processors; and
 one or more memory units storing instructions that are operable by the one or more processors to perform operations comprising:
  creating acoustic images using the acoustic sensor from acoustic reflections from the tubular and portions of the apparatus contacting the tubular;
  storing the acoustic images in the one or more memory units;
  processing the acoustic images with a computer model to determine a location of the apparatus; and
  outputting the location of the apparatus.

13. The system of claim 12, further comprising converting acoustic reflections to one or more intensity features of the image that represent at least one of: maximum intensity, average intensity, standard deviation of intensity, average intensities for plural radial ranges, or radius of center of intensity.

14. The system of claim 12, wherein processing the acoustic images comprises image processing to identify edges of the apparatus.

15. The system of claim 12, further comprising determining an azimuthal location of the apparatus with respect to the tubular.

16. The system of claim 12, wherein the acoustic sensor comprises a phased-array of acoustic transducer elements, and further comprising beamforming the phased-array to optimize reflections from the apparatus.

17. The system of claim 12, wherein the computer model comprises one or more of a machine learning classifier and a Convolutional Neural Net (CNN).

18. The system of claim 12, further comprising training a classifier of the computer model with a set of labelled training images of tubulars.

19. The system of claim 12, wherein the computer model comprises a regression network to output a value for azimuthal location of the apparatus on the tubular.

20. An apparatus, comprising:
 one or more non-transitory memories storing a computer model of acoustic reflections from external apparatus;
 a processor configured to execute instructions stored in the one or more non-transitory memories to:
  receive acoustic images of tubulars and apparatus mounted externally thereto; and
  convolve the acoustic images with the computer model to determine a location of any external apparatus detected; and
  output the location of the any external apparatus.

* * * * *